United States Patent [19]

Hanrahan, Jr. et al.

[11] 4,134,955
[45] Jan. 16, 1979

[54] INJECTION MOLDING FOOTWEAR

[75] Inventors: James R. Hanrahan, Jr., Fairfield, Conn.; Richard G. Levine, Lawrence, N.Y.

[73] Assignee: Air Industries, Concord, N.C.

[21] Appl. No.: 767,048

[22] Filed: Feb. 9, 1977

Related U.S. Application Data

[63] Continuation of Ser. No. 666,251, Mar. 12, 1976, abandoned.

[51] Int. Cl.$^2$ .................. B29C 5/00; B29D 9/00; B29F 1/10
[52] U.S. Cl. .................. 264/244; 264/259; 264/328
[58] Field of Search .................. 264/244, 259, 328; 36/9 R, DIG. 2

[56] References Cited

U.S. PATENT DOCUMENTS

| | | | |
|---|---|---|---|
| 1,955,720 | 4/1934 | Rollman | 36/9 R |
| 2,147,197 | 2/1939 | Glidden | 36/9 R |
| 3,031,723 | 5/1962 | Baudou | 264/244 |
| 3,035,291 | 5/1962 | Bingham | 264/244 |
| 3,324,220 | 6/1967 | Goy | 264/244 |
| 3,383,782 | 5/1968 | McGinnity | 36/9 R |
| 3,416,174 | 12/1968 | Novitske | 36/9 R |
| 3,611,501 | 10/1971 | Daum et al. | 264/244 |
| 3,676,542 | 7/1972 | Maltby | 264/244 |
| 3,863,272 | 2/1975 | Guille | 36/9 R |

Primary Examiner—W.E. Hoag
Attorney, Agent, or Firm—James J. Burke, II

[57] ABSTRACT

Method of making casual footwear including a knitted fabric upper, a woven insole portion, and an injection-molded sole is produced in a mold cycle of 45-second duration, as opposed to five or six minutes heretofore generally required, or the +2 minutes with the latest known materials. Molding conditions and materials are carefully controlled, and substantial penetration of the woven and knitted fabrics by the injected material is achieved. The woven insole portion prevents the flowing plastic from pushing the upper over the last. Ethylene/ethyl acrylate copolymer, polyvinyl chloride and styrene butadiene are preferred sole thermoplastics.

6 Claims, 2 Drawing Figures

INJECTION MOLDING FOOTWEAR

This application is a continuation of application Ser. No. 666,251, filed Mar. 12, 1976, and now abandoned.

BACKGROUND OF THE INVENTION

The present invention relates generally to injection molding and, more particularly, it relates to the production of casual footwear of the slipper type including an upper of a knitted fabric, preferably of the stretch type, a woven insole, and an integral, injection-molded sole of a thermoplastic material.

Footwear having an injection-molded bottom or sole portion directly attached to a fabric upper has been produced for many years. Generally, an injection-molding machine is provided with a fixed, partial mold assembly in the fixed platen, including a depression in the shape of a shoe sole and of a depth as great as the desired sole thickness. This partial mold is connected through a sprue to a plastic injector nozzle, and is also suitably gated.

A last assembly is spaced vertically above the partial mold and, upon actuation of the machine, moves downwardly thereover. The last is generally foot-shaped and, of course, is sized to fit closely over the mold cavity, capping it, and leave a closed space of the desired sole thickness and configuration. Provision is made for maintaining the liquid thermoplastic at desired temperatures as it is injected, flows into the mold and solidifies, this being accomplished by heating means in the melt and chillers in the mold.

In practice, an operator fits an upper over the last (or, more typically, a right-and-left pair of lasts) and actuates the machine. The last drops over the mold, the plastic is injected and, after a predetermined cooling period, the last moves back to its upper position and the completed article is removed therefrom. The time period from one machine activation to the next is referred to as the mold cycle.

The duration of the mold cycle depends to a large extent on the required cooling time for the thermoplastic, the speed of plastic injection, and, to a lesser extent, on the complexity of the manual loading operation (as noted hereinbelow, much of this footwear includes, in addition to an upper and a sole, preformed insoles, peripheral molded bands, cleats, etc.). Of course, if the operator is required to tend a plurality of machines and is not present at the end of each operation, mold cycle time is further increased.

Thus, with a minimum cooling time of about 1.5 minutes, which implies a minimum mold cycle of about 2.5 minutes, it will be appreciated that such operations are severly limited in terms of labor productivity and capital productivity, even though one can trade off one at the expense of the other.

PRIOR ART

Understanding of the present invention will be facilitated by consideration of what is believed to be the most pertinent prior art.

U.S. Pat. No. 3,863,272 : A knitted fabric upper and a sole of a velvet pile or felt are joined with a molded plastic around the periphery of the sole, the fabric stitching being close enough to prevent penetration of the plastic therethrough.

The long cycle times noted above are acknowledged in U.S. Pat. No. 3,416,174, and are shortened by quickly removing the shoe from the mold, and completing the curing in an oven, rotating the shoe on the last to prevent damaging flow during this period.

U.S. Pat. Nos. 3,577,503 and 3,757,437 are typical of many where provision is made for attachment of cleats to an injection molded sole in an athletic shoe. U.S. Pat. No. 3,855,657 includes a vacuum holder for a decorative edge or foxing between the upper and the sole. U.S. Pat. No. 3,806,974 is typical of many invention and design patents on specific configurations of soles, in this case including wavy, elongated grooves.

Long cycle times are inherent in the apparatus disclosed in U.S. Pat. No. 3,199,149 where, rather than injection molding, a moving plastisol dispenser first deposits the sole material in an open mold, and a last with an upper then swings down into contact therewith.

U.S. Pat. No. 3,031,723 discloses a variety of ways to clamp an upper, bend over the extending edges, and mold the sole portion thereto. U.S. Pat. No. 3,035,291 discloses bonding a sock member to a boot member. In U.S. Pat. No. 3,063,074 a cushion insole is provided with a cement layer, and glued to an insideout upper. The cycle time in all of these disclosures is inherently long.

OBJECTS OF THE INVENTION

A general object of the present invention is to provide an improved method of producing casual footwear with injection-molded soles.

A further object of the present invention is to provide a method of producing footwear having a fabric upper and an integral, injection-molded sole substantially faster than has heretofore been possible.

Another object of the present invention is to provide a method of producing footwear having a fabric upper and an integral, injection molded sole substantially less expensively than has heretofore been possible.

Various other objects and advantages of the invention will become clear from the following detailed description of the embodiments thereof, and the novel features will be particularly pointed out in connection with the appended claims.

THE DRAWINGS

References will hereinafter be made to the accompanying drawings, wherein:

FIG. 1 is a perspective view, partially in phantom, showing a mold and last assembly suitable for carrying out the invention; and FIG. 2 is a partial, cross-sectional elevation, greatly enlarged, of a sole and upper formed in accordance with the invention.

SUMMARY OF THE INVENTION

The present invention is based in its major part upon a realization that heretofore the fabric uppers, separate insoles and other preformed portions of the footwear served to insulate the injected plastic from either the mold, the last, or both, and that required cooling time is a function of heat flow from the plastic through these parts. With this realization, it was determined that cooling or curing time was substantially reduced if the fabric upper was stretched, in fitting it over the last, to an extent sufficient to open up the stitches and thereby allow the plastic to relatively freely flow through the fabric and into direct, heat-exchange contact with the last. The extent that stretching of the fabric to open the stitching reduces cooling time is considered surprising.

With one copolymer, the manufacturer's minimum cooling time is said to be 1.5 minutes, with particular temperatures in the various control zones. Using the same temperatures and other molding parameters, and by stretching a knitted nylon upper over the last so that openings between the stitches were clearly visible, cooling time was reduced to about 10 seconds, a reduction of roughly 90%.

However, maintaining short cycle times, also involves fast injection of the plastic under substantial pressure, and the rheological properties of available injection molding materials are such that the plastic tends to push the fabric ahead of it, resulting in a distorted and unattractive product. While an elasticized, knitted upper is needed to conform to the wearers foot, knitted fabric is not needed in the insole portion. The "pushing" problem is thus solved by providing an upper which is in two parts: a woven insole portion and an elasticized, knitted upper. The woven insole portion, being inherently of tighter construction, resists deep penetration by the moving plastic and is thus able to retain its position during molding.

The insole portion is cut generally smaller than the ultimate sole size, ¼ or ⅜ inch smaller all around being typical. This insures that the elasticized portion will be stretched around the last, with the fabric opened up, so that a particularly excellent bond between fabric and sole is formed around the periphery of the article.

When the completed article is removed from the last, the free portion of the knitted upper returns to its normal stitch spacing (except immediately adjacent the sole). As such, it is free to stretch and conform to the wearer's foot during use.

DESCRIPTION OF EMBODIMENTS

Figure 1:
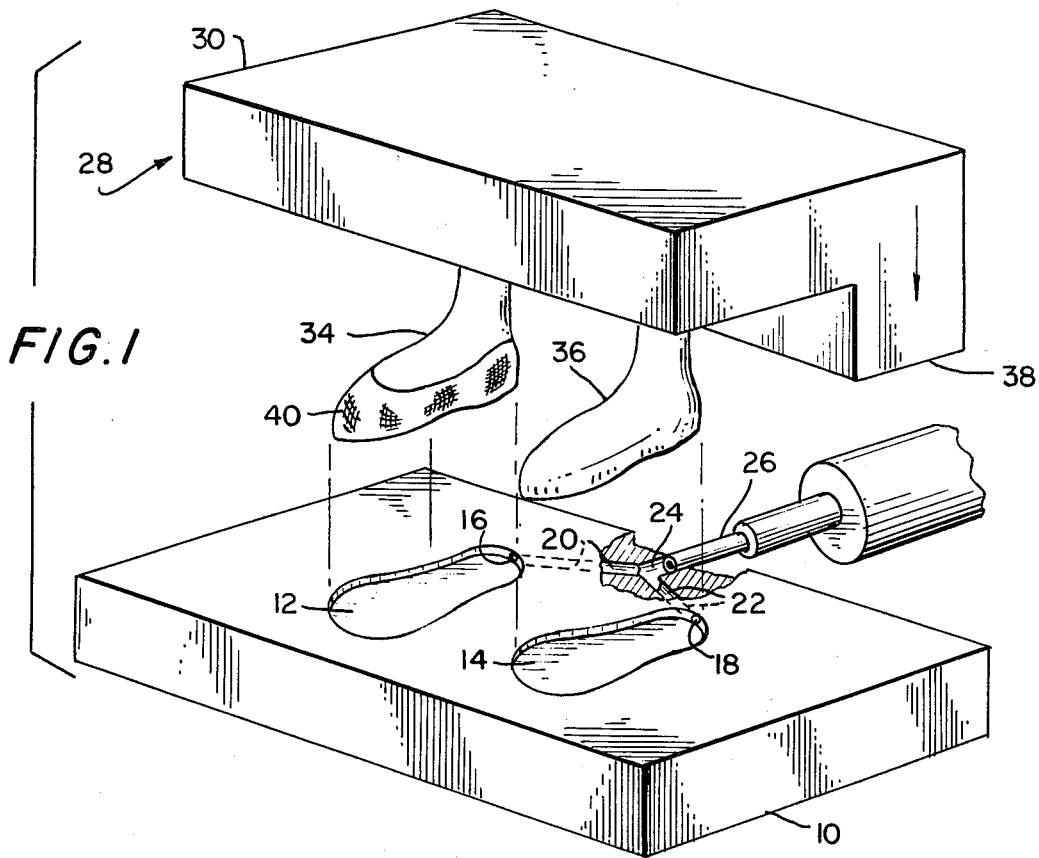

FIG. 1 illustrates suitable equipment for carrying out the invention, and attention is directed thereto.

A fixed mold or platen 10 has a pair of depressed mold cavities 12, 14 corresponding to a left and right shoe. Openings 16, 18 at the rear or heel portion connect the cavities via passages 20, 22 with an open, Y-shaped sprue 24, the base of which is in communication with the injector nozzle 26.

A pneumatically operated last assembly 28 comprises a moving platen 30 mounted on suitable tie rods (not shown) and actuated by a toggle mechanism. A pair of lasts 34, 36 are secured to the lower surface of platen 28 in spaced, vertical alignment with cavities 12, 14. The rear portion 38 of the lower surface of platen 28 is adapted to close sprue 24 when the machine is activated. A blind hole (not shown) on surface 38 above the base of the Y in sprue 24 fills with plastic during the cycle. As platen 30 rises, the sprue breaks off at openings 16, 18 and the operator pulls it out.

In operation, fabric uppers 40 are stretched over lasts 34, 36 and the machine is activated. It has been determined that one operator can conveniently run two machines on a 45 second cycle time. When platen 28 rises to its upper or rest position, the operator removes the sprue, removes the completed slippers, and fits on two more uppers.

Figure 2:
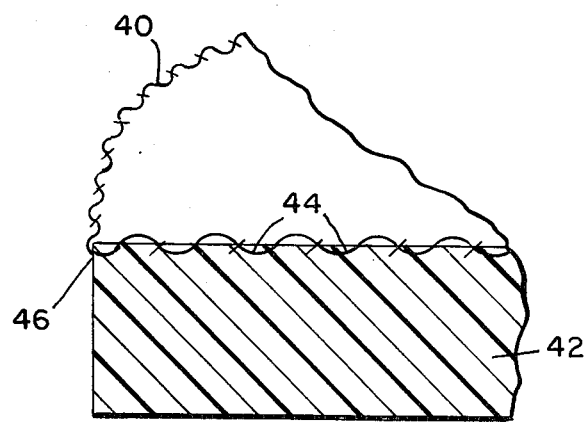

FIG. 2 illustrates, in exaggerated form a slipper in accordance with the invention having an elasticized, knitted upper 40 and a molded sole 42, with woven fabric 44 forming the insole. It will be appreciated that, during molding, the liquid thermoplastic will readily penetrate the stretched fabric 40 and discontinuously contact the last, but will not penetrate woven fabric 44 as much.

In a machine such as shown in FIG. 1, where injection is into the heel, pushing of the fabric would be worst at toe 46 (in FIG. 2), since the plastic is most vicous at this point. This is completely eliminated by woven insole portion 44.

While it is preferred for obvious reasons to use the so-called stretch-knit fabrics for the uppers, it has been found that ordinary, non-stretch knits have enough elasticity to conform to the wearer's foot. What is important is that the upper be sized properly so as to "open" when fitted over the last. Acrylic, cotton and nylon fabrics have all proved suitable. For example, 70/2, 34 Filament Texturalized nylon plaited with acrylic, stretch terrycloth and cushionfoot fabrics may all be used.

While the choice of a thermoplastic is not crucial to the invention, three such materials have been eminently successful and are preferred. These are styrene butadiene (sold by Shell Chemical Co. under the trademark Kraton) and ethylene/ethyl acrylate or EEA (sold by Union Carbide Corp. under the trademark Bakelite) and polyvinyl chloride (PVC). Except as herein noted, the manufacturer's recommendations are followed.

It will be appreciated that the mold cycle times achieved by the present invention require that the sole be relatively thin, and would be largely if not entirely lost on "wedge" type footwear, where the sheer bulk of the sole will necessitate a longer cooling time. The preferred sole thickness for footwear in accordance with the invention is a maximum of about 3/16 inch down to a lower limit determined by the rheological properties of the thermoplastic. Very good results are obtained with a thickness of ⅛ inch.

Various changes in the details, steps, materials, and arrangements of parts, which have been herein described and illustrated in order to explain the nature of the invention, may be made by those skilled in the art within the principle and scope of the invention as defined in the appended claims.

What is claimed is:

1. In a process for producing footwear having a molded sole portion attached to a knitted fabric upper, wherein said upper is fitted over a last, the last and upper are clamped over the top of an open mold cavity, and a liquid thermoplastic material is injected into said cavity to form, upon cooling, said molded sole, the improvements comprising providing said upper with an attached, tightly woven insole portion smaller than said molded sole, said upper and last being dimensioned so as to require stretching of said upper over said last thereby creating openings between the stitches of said knitted upper, said insole portion preventing said thermoplastic from pushing said upper on said last.

2. The process as claimed in claim 1, wherein said knitted fabric is elasticized.

3. The process as claimed in claim 1, wherein said thermoplastic material is selected from the group consisting of ethylene/ethyl acrylate, styrene butadiene and polyvinyl chloride.

4. A process for producing footwear having a fabric upper and an integral injection-molded sole portion comprising:

preforming a knitted fabric upper with a woven insole portion smaller than said molded sole;

fitting said upper over a last, said upper being dimensioned so as to require stretching thereover, thereby creating openings between the stitches of said upper around the peripheral surface of said last;

clamping said last and upper over an open mold cavity;

injecting a liquid thermoplastic material into said cavity, said material penetrating through said openings around the periphery of said insole portion while chilling said mold; and removing said last from said mold and said footwear from said last.

5. The process as claimed in claim 4, wherein said knitted fabric is elasticized.

6. The process as claimed in claim 4, wherein said thermoplastic material is selected from the group consisting of ethylene/ethyl acrylate, styrene butadiene and polyvinyl chloride.

* * * * *